United States Patent
Bade et al.

(10) Patent No.: US 8,055,912 B2
(45) Date of Patent: Nov. 8, 2011

(54) METHOD AND SYSTEM FOR BOOTSTRAPPING A TRUSTED SERVER HAVING REDUNDANT TRUSTED PLATFORM MODULES

(75) Inventors: Steven A. Bade, Georgetown, TX (US); Linda Nancy Betz, Poughkeepsie, NY (US); Andrew Gregory Kegel, Redmond, WA (US); David R. Safford, Putnam, NY (US); Leendert Peter Van Doorn, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/621,524

(22) Filed: Nov. 19, 2009

(65) Prior Publication Data

US 2010/0070781 A1   Mar. 18, 2010

Related U.S. Application Data

(63) Continuation of application No. 10/835,498, filed on Apr. 29, 2004, now Pat. No. 7,664,965.

(51) Int. Cl.
    *G06F 11/30* (2006.01)
(52) U.S. Cl. .............................. 713/193
(58) Field of Classification Search ............ 713/2, 164, 713/168, 193
    See application file for complete search history.

(56) References Cited

U.S. PATENT DOCUMENTS

| | | | |
|---|---|---|---|
| 5,404,563 A | 4/1995 | Green et al. | |
| 5,421,006 A | 5/1995 | Jabion et al. | |
| 6,185,678 B1 * | 2/2001 | Arbaugh et al. | 713/2 |
| 6,629,192 B1 | 9/2003 | Schaefer et al. | |
| 6,948,065 B2 | 9/2005 | Grawrock | |
| 7,117,376 B2 * | 10/2006 | Grawrock | 380/277 |
| 7,137,004 B2 * | 11/2006 | England et al. | 713/176 |
| 7,179,170 B2 | 2/2007 | Martinek et al. | |
| 7,200,758 B2 * | 4/2007 | Zimmer | 713/192 |
| 7,216,369 B2 | 5/2007 | Wiseman et al. | |
| 2003/0033495 A1 | 2/2003 | Lawman et al. | |
| 2003/0056109 A1 | 3/2003 | Elliott et al. | |
| 2003/0110372 A1 * | 6/2003 | Proudler | 713/150 |
| 2003/0115453 A1 | 6/2003 | Grawrock | |
| 2003/0188162 A1 | 10/2003 | Candelore et al. | |
| 2003/0226040 A1 | 12/2003 | Challener et al. | |
| 2005/0044408 A1 | 2/2005 | Bajikar et al. | |
| 2005/0138370 A1 | 6/2005 | Goud et al. | |

FOREIGN PATENT DOCUMENTS

JP   2004152001   5/2004

* cited by examiner

*Primary Examiner* — Michael Pyzocha
*Assistant Examiner* — Ali S Abyaneh
(74) *Attorney, Agent, or Firm* — Matthew B. Talpis; Jack V. Musgrove

(57) ABSTRACT

Multiple trusted platform modules within a data processing system are used in a redundant manner that provides a reliable mechanism for securely storing secret data at rest that is used to bootstrap a system trusted platform module. A hypervisor requests each trusted platform module to encrypt a copy of the secret data, thereby generating multiple versions of encrypted secret data values, which are then stored within a non-volatile memory within the trusted platform. At some later point in time, the encrypted secret data values are retrieved, decrypted by the trusted platform module that performed the previous encryption, and then compared to each other. If any of the decrypted values do not match a quorum of values from the comparison operation, then a corresponding trusted platform module for a non-matching decrypted value is designated as defective because it has not been able to correctly decrypt a value that it previously encrypted.

9 Claims, 4 Drawing Sheets

METHOD AND SYSTEM FOR BOOTSTRAPPING A TRUSTED SERVER HAVING REDUNDANT TRUSTED PLATFORM MODULES

CROSS-REFERENCE TO RELATED APPLICATION

This application is a continuation of U.S. patent application Ser. No. 10/835,498 filed Apr. 29, 2004 now U.S. Pat. No. 7,664,965 which is hereby incorporated.

BACKGROUND OF THE INVENTION

1. Field of the Invention

The present invention relates to an improved data processing system and, in particular, to a method and apparatus for data storage protection using cryptography.

2. Description of the Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform module physically secures and protects certain cryptographic key data. Each trusted platform module is unique at the point of manufacture. If a trusted platform module fails, the cryptographic key material that is protected by the device is rendered unusable.

Current trusted platform architectures focus on low-cost security modules, which are tied to a single system, such as a desktop computer or portable computer. Although these low-cost security modules are not necessarily prone to failure, the failure of a security module within a desktop computer would generally have less costly and less labor-intensive consequences than the failure of a similar security module within a high-performance server, which are often manufactured with redundant capabilities in order to avoid an unacceptable single point of failure.

Therefore, it would be advantageous to have a mechanism for improving the availability of a trusted platform module. It would be particularly advantageous to allow the use of low-cost trusted platform modules while ensuring system availability.

SUMMARY OF THE INVENTION

A method, a system, an apparatus, and a computer program product enable multiple trusted platform modules to be used in a redundant manner within a data processing system. A hypervisor that is executing on the data processing system reads secret data stored within a trusted platform in the data processing system and then requests that each trusted platform module in the data processing system encrypt a copy of the secret data, thereby generating multiple versions of encrypted secret data values. The encrypted secret data values are stored within a non-volatile memory within the trusted platform. At some later point in time, the encrypted secret data values are retrieved, decrypted by the trusted platform module that performed the previous encryption, and then compared to each other. If any of the decrypted values do not match a quorum of values from the comparison operation, then a corresponding trusted platform module for a non-matching decrypted value is designated as defective because it has not been able to correctly decrypt a value that it previously encrypted. Establishing a quorum of multiple trusted platform modules provides a reliability mechanism for securely storing secret material at rest that is used to bootstrap the system trusted platform module.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DESCRIPTION OF THE PREFERRED EMBODIMENT(S)

In general, the devices that may comprise or relate to the present invention include a wide variety of data processing technology. Therefore, as background, a typical organization of hardware and software components within a distributed data processing system is described prior to describing the present invention in more detail.

Figure 1A:
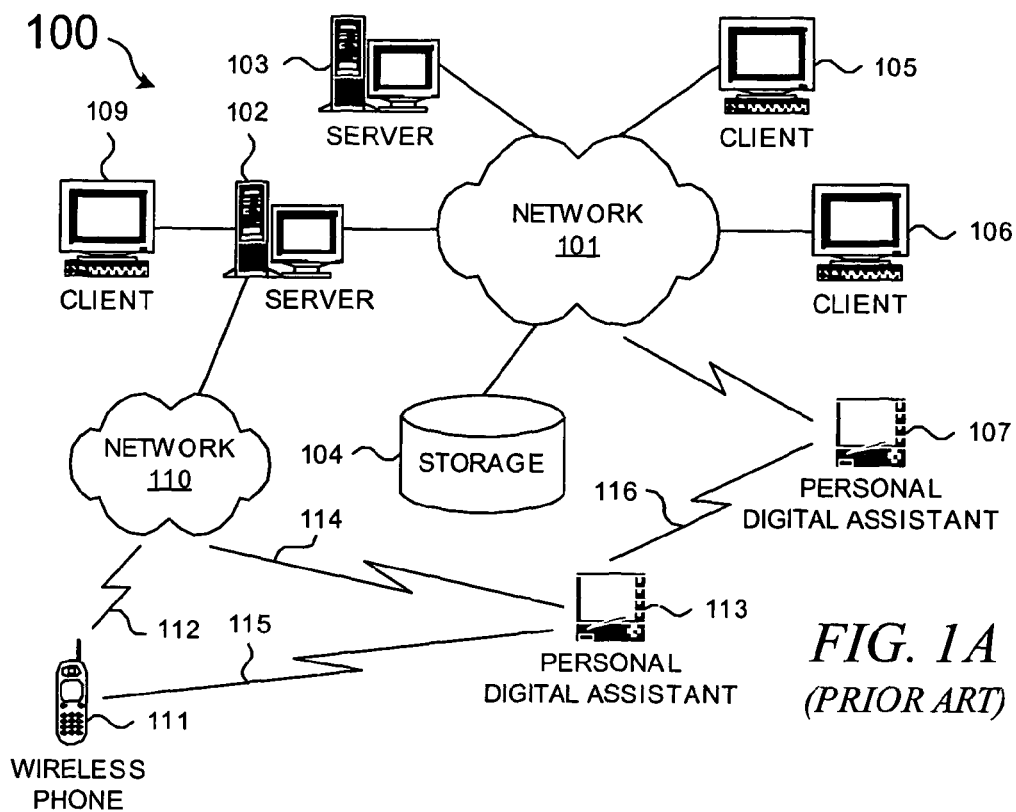
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. of course, distributed data processing system 100 may also include a number of different types of networks, such as, for example, an intranet, a local area network (LAN), or a wide area network (WAN). For example, server 102 directly supports client 109 and network 110, which incorporates wireless communication links Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
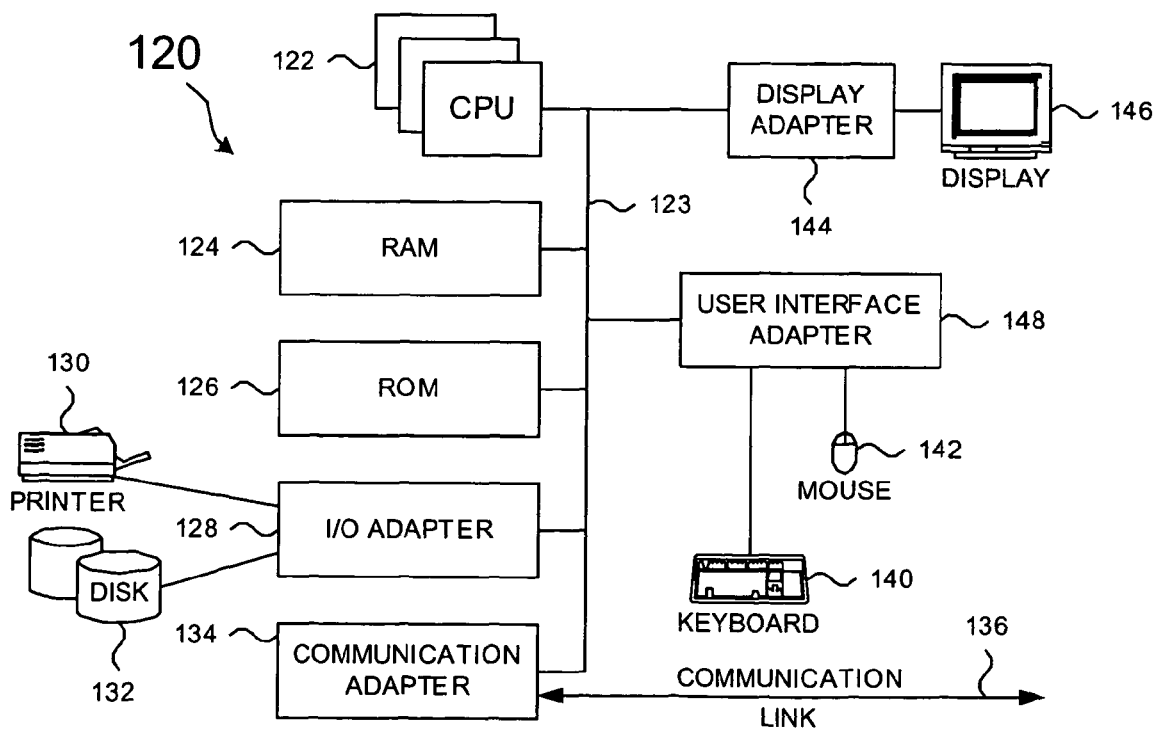
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel®. Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to enabling trusted computing platforms. Before describing the present invention in more detail, though, some background information about trusted computing platforms is provided for evaluating the operational efficiencies and other advantages of the present invention. Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

Figure 2:
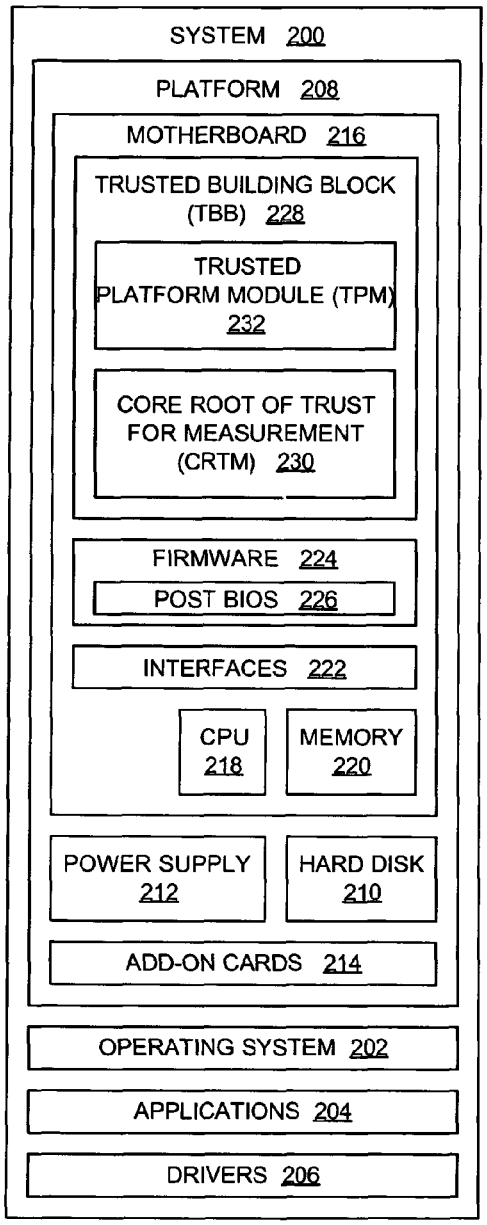
FIG. 2 depicts a block diagram that shows an example of a typical trusted platform architecture.

With reference now to FIG. 2, a block diagram depicts some of the components in a data processing system that is constructed using a model of a trusted platform architecture. Trusted platform architectures may be implemented for particular computational environments or for particular classes of devices; FIG. 2 depicts a trusted platform architecture in accordance with the TCG's PC-specific implementation specification.

System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPU's. Interfaces 222 connect motherboard 216 to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
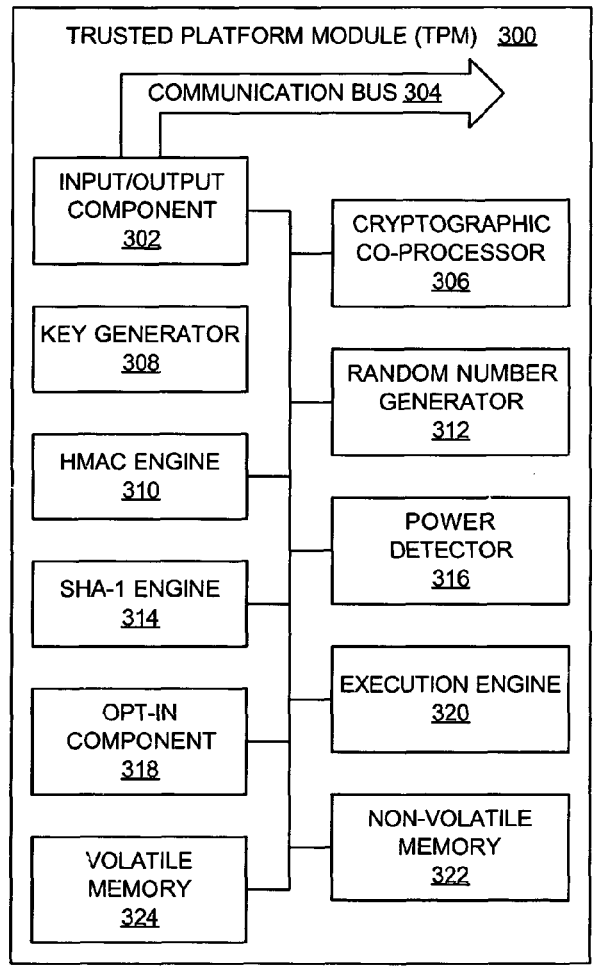
FIG. 3 depicts a block diagram that shows some of the major components of a typical trusted platform module.

With reference now to FIG. 3, a block diagram depicts some of the major components of a trusted platform module according to TCG specifications. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Given the background information on trusted computing platforms that has been described with respect to FIG. 2 and FIG. 3, a detailed description of the present invention is provided hereinbelow with respect to the remaining figures. As noted above, typical trusted platforms have been designed such that a trusted platform module exists within a trusted platform architecture as a potentially catastrophic single point of failure, which would be unacceptable behavior in a high-performance server or similar high-cost computing device. The present invention addresses this problem by providing redundancy with trusted platform modules as explained in more detail hereinbelow.

Figure 4:
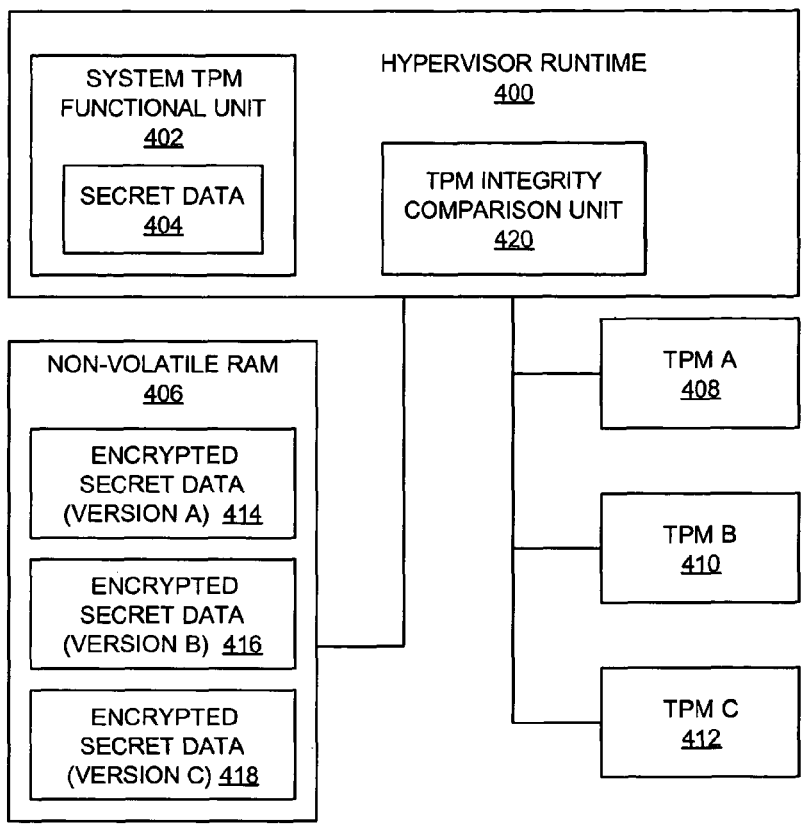
FIG. 4 depicts a block diagram that shows some of the components on a trusted platform that contains redundant trusted platform modules in accordance with an embodiment of the present invention.

With reference now to FIG. 4, a block diagram depicts some of the components on a trusted platform that contains redundant trusted platform modules in accordance with an embodiment of the present invention. Hypervisor runtime 400 contains system TPM functional unit 402 within which secret data 404 either has been injected by the manufacturer during the manufacture of system TPM functional unit 402 or has been generated by system TPM functional unit 402. Non-volatile RAM 406 provides a secure datastore; access to non-volatile RAM 406 is physically hardware-restricted to hypervisor 400, which uses non-volatile RAM 406 to store different encrypted versions of secret data 404. Hypervisor 400 invokes functionality in TPM 408, TPM 410, and TPM 412 to generate encrypted secret data 414, encrypted secret data 416, and encrypted secret data 418, respectively. Multiple TPM's are available in a redundant manner; the trusted platform comprises a minimum of three trusted platform modules for completing a redundancy operation through the use of TPM integrity comparison unit 420 in hypervisor 400, as explained in more detail further below.

Figure 5:
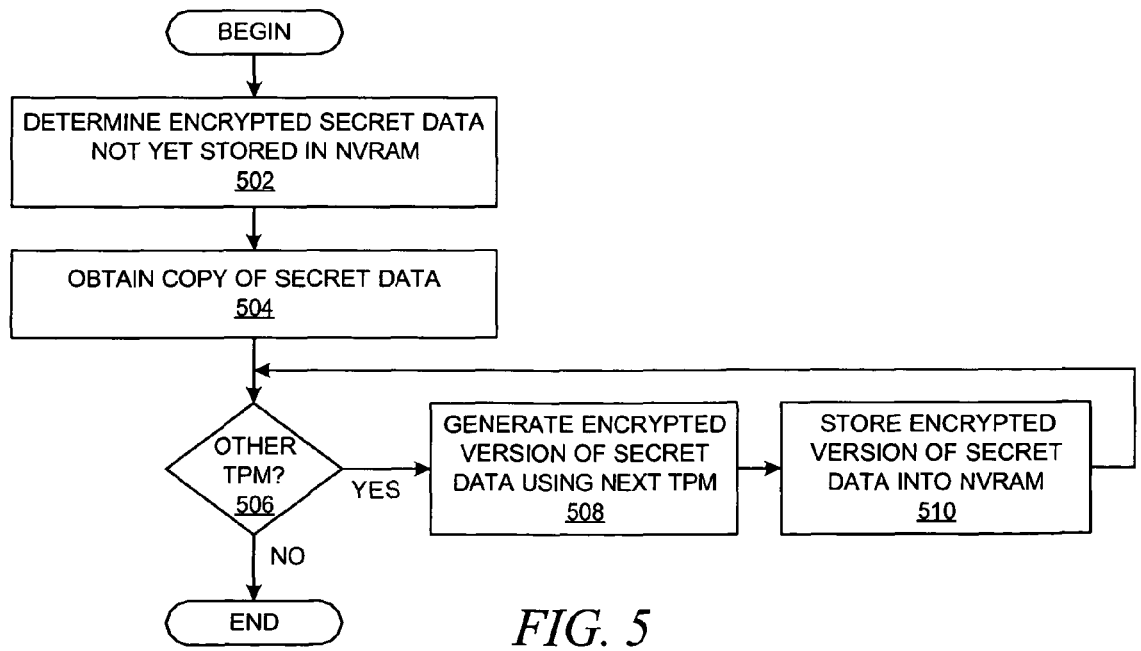
FIG. 5 depicts a flowchart that shows a configuration process for a system that employs multiple redundant physical trusted platform modules in accordance with an embodiment of the present invention.

With reference now to FIG. 5, a flowchart depicts a configuration process for a data processing system that employs multiple redundant physical trusted platform modules in accordance with an embodiment of the present invention. The process commences with a hypervisor on a trusted platform of a data processing system detecting that encrypted secret data that will be used when bootstrapping the data processing system has not yet been generated; for example, the hypervisor determines that the non-volatile RAM (NVRAM) on the trusted platform does not yet store the encrypted secret data (step 502). Preferably, predetermined locations within the non-volatile RAM are reserved for the encrypted secret data, and the hypervisor may check those particular locations for valid data. It may be assumed that the secret data either has been injected by the manufacturer during the manufacture of the trusted platform or has been generated by the trusted platform during the manufacturing process or at some other time, such as the process of taking ownership of the trusted platform. The process that is shown in FIG. 5 may occur during the manufacture of the trusted platform, or it may occur when an entity takes ownership of the trusted platform.

After determining that the non-volatile RAM does not yet hold the encrypted secret data, the hypervisor requests each trusted platform module on the trusted platform to encrypt the secret data. The hypervisor obtains a copy of the secret data (step 504) and determines if there is a TPM that has not yet been used to generate an encrypted version of the secret data (step 506); if not, then the process is concluded. If all of the TPM's have not yet already generated an encrypted version of the secret data, then the hypervisor sends a request to the next unused TPM to encrypt a copy of the secret data (step 508), which is then stored into the non-volatile RAM (step 510). The hypervisor calls on each TPM, thereby generating multiple encrypted versions of the secret data through the redundant TPM's until the process is concluded. By performing this process during the manufacture or configuration of the trusted platform, the process that is shown in FIG. 5 creates a set of checkpoint values that may be subsequently used to determine whether or not a trusted platform module has become defective.

Figure 6:
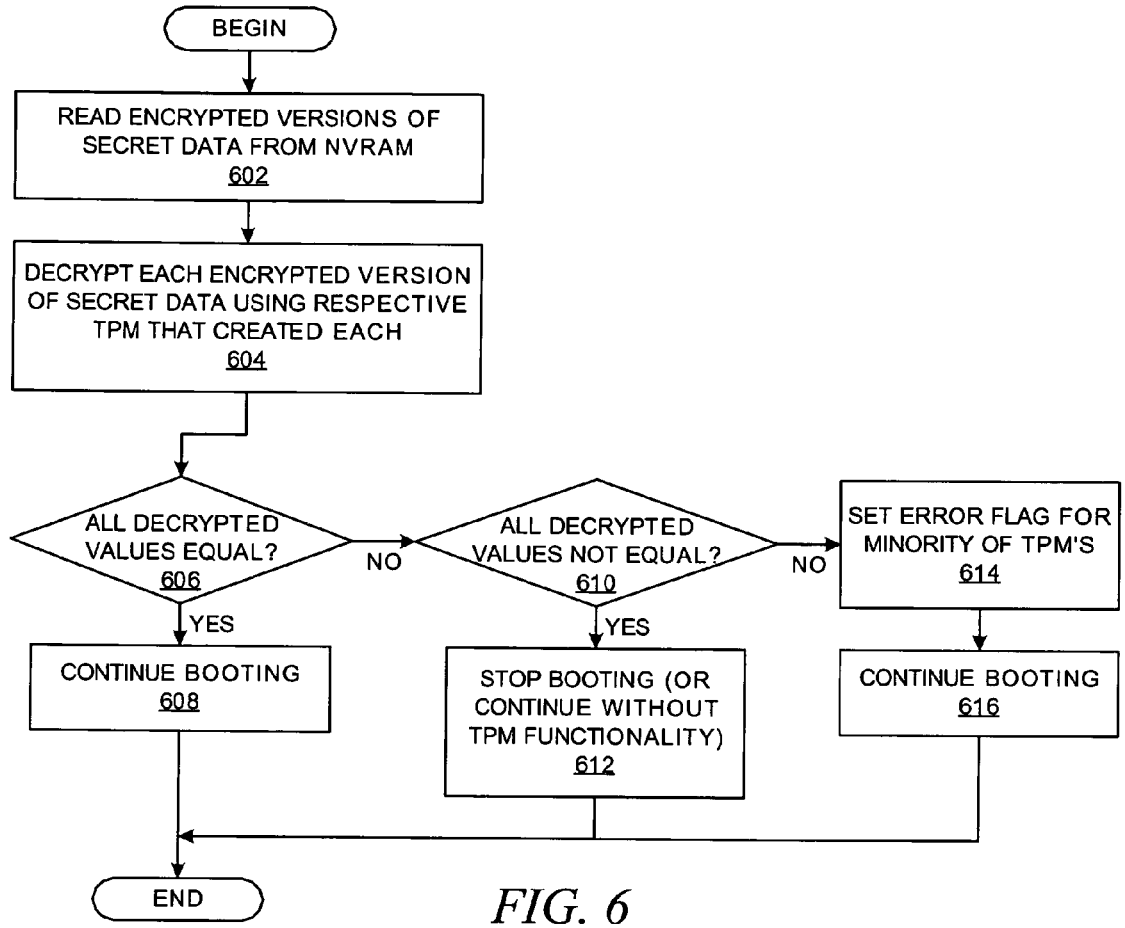
FIG. 6 depicts a flowchart that shows a bootstrapping process for a data processing system that employs multiple redundant physical trusted platform modules in accordance with an embodiment of the present invention.

With reference now to FIG. 6, a flowchart depicts a portion of a bootstrapping process for a data processing system that employs multiple redundant physical trusted platform modules in accordance with an embodiment of the present invention. The process commences with the starting of the hypervisor on a trusted platform of a data processing system, e.g., during startup or restart of the data processing system, after which the hypervisor reads the multiple encrypted versions of the secret data that were previously stored within the non-volatile RAM on the trusted platform (step 602), e.g., using the process that is depicted within FIG. 5. The hypervisor decrypts each encrypted version of the secret data using the respective TPM that generated the encrypted version (step 604).

The hypervisor then compares the decrypted values against each other to determine whether or not all of the decrypted values are equal to each other (step 606). If the decrypted values are all equal to each other, then the hypervisor may continue its bootstrapping process (step 608), and the process is concluded. If it is determined that no decrypted values are equal to any other decrypted values (step 610), then the boot process is stopped (step 612) or, alternatively, the boot process continues but without TPM functionality on the data processing system.

The process then continues by attempting to determine if a quorum has been established among the decrypted values. In other words, the decrypted values are compared, and equal values are logically grouped to determine if a set of equal values represents a majority of the set of available values, i.e., greater than fifty percent of the available values. If so, then a quorum has been established. If there is a set of equal values but it does not represent a majority of the set of available values, then a quorum has not been established. In alternative embodiments, other comparative algorithms may be employed, possibly depending on the number of TPM's within the data processing system.

Hence, if it is determined that there is a quorum amongst the decrypted values, then an error flag is set for each TPM that failed to generate a matching value with the majority of TPM's (step 614), and the booting process is allowed to continue (step 616); in other words, each TPM that failed to produce a value in the quorum is flagged as being in error. Alternatively, other methods for designating a TPM as defective may be used.

For example, referring again to FIG. 4, an example of a trusted platform depicts a minimum of three TPM's. Using the process that is shown in FIG. 6 for a system with three TPM's, if two TPM's are able to generate two matching decrypted values for the previously encrypted secret data, then the bootstrapping process is able to continue; in other words, a quorum is determined to exist with at least two matching decrypted values.

Figure 7:
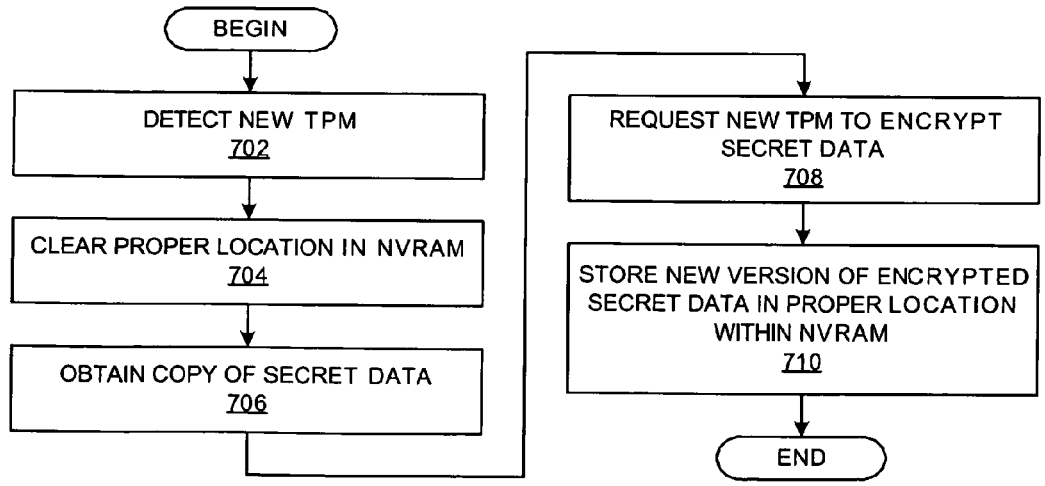
FIG. 7 depicts a flowchart that shows a process for incorporating a new trusted platform module within a data processing system that employs multiple redundant physical trusted platform modules in accordance with an embodiment of the present invention.

With reference now to FIG. 7, a flowchart depicts a process for incorporating a new trusted platform module within a data processing system that employs multiple redundant physical trusted platform modules in accordance with an embodiment of the present invention. The process that is shown in FIG. 7 assumes that a failed TPM has previously been detected and flagged, e.g., using the process that is depicted within FIG. 6, possibly followed by logging the event for a system administrator to discover and review. The failed TPM would then be physically removed and replaced with a new TPM.

The process commences at some later point in time when the hypervisor detects the new TPM (step 702). If necessary, the hypervisor clears the proper location within the non-volatile RAM on the trusted platform that has been reserved for holding corresponding data from the replaced TPM (step 704). The hypervisor obtains a copy of the secret data (step 706) and sends a request to the new TPM to encrypt a copy of the secret data (step 708), which is then stored into a predetermined location within the non-volatile RAM (step 710) so that the non-volatile RAM contains all of the data that would be necessary for completing a TPM integrity check operation when bootstrapping the data processing system in the manner that is described above with respect to FIG. 6.

The advantages of the present invention should be apparent in view of the detailed description that is provided above. By maintaining multiple copies of the encrypted secret data in non-volatile RAM, each of which corresponds to a trusted platform module within the data processing system, the hypervisor within the data processing system is able to detect the failure of one or more TPM's by decrypting the copies of the encrypted secret data and comparing the decrypted values in an attempt to establish a quorum among the decrypted values. If a quorum is found among the decrypted values, the data processing system may continue to operate without suffering catastrophic failure of the entire data processing system that might have otherwise been caused by the failed TPM(s) on a typical prior art system.

It is important to note that while the present invention has been described in the context of a fully functioning data processing system, those of ordinary skill in the art will appreciate that the processes of the present invention are capable of being distributed in the form of instructions in a computer readable medium regardless of the particular type of media actually used to carry out the distribution. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product on a computer readable medium for using trusted platform modules within a data processing system, wherein a trusted platform in the data processing system comprises at least one non-volatile memory, the computer program product comprising:

means for reading secret data stored within the trusted platform in the data processing system using a hypervisor executing on the data processing system;

means for requesting a trusted platform module in the data processing system to encrypt a copy of the secret data to generate an encrypted secret data value;

means for storing the previously generated encrypted secret data value within the non-volatile memory within the trusted platform;

means for repeatedly generating encrypted secret data values for each other trusted platform module within the data processing system and storing the generated encrypted secret data values so that the non-volatile memory contains multiple encrypted secret data values, each of which is associated with the trusted platform module that generated the respective encrypted secret data value;

means for retrieving the encrypted secret data value from the non-volatile memory;

means for requesting decryption of the retrieved encrypted secret data value from the trusted platform module that generated the retrieved encrypted secret data value in order to generate a decrypted secret data value;

means for repeatedly generating decrypted secret data values for each other trusted platform module within the data processing system;

means for comparing the decrypted secret data values; and means for identifying zero or more defective trusted platform modules based on the comparison of the decrypted secret data values.

2. The computer program product of claim 1 further comprising:

means for designating the trusted platform module as defective if the decrypted secret data value that is associated with the trusted platform module does not match one or more decrypted secret data values that are associated with different trusted platform modules within the data processing system.

3. The computer program product of claim 1 wherein the means for identifying defective trusted platform modules is used upon startup or restart of the data processing system.

4. An apparatus for using trusted platform modules within a data processing system, wherein a trusted platform in the data processing system comprises at least one non-volatile memory, the apparatus comprising:

means for reading secret data stored within the trusted platform in the data processing system using a hypervisor executing on the data processing system;

means for requesting a trusted platform module in the data processing system to encrypt a copy of the secret data to generate an encrypted secret data value;

means for storing the previously generated encrypted secret data value within the non-volatile memory within the trusted platform;

means for repeatedly generating encrypted secret data values for each other trusted platform module within the data processing system and storing the generated encrypted secret data values so that the non-volatile memory contains multiple encrypted secret data values, each of which is associated with the trusted platform module that generated the respective encrypted secret data value;

means for retrieving the encrypted secret data value from the non-volatile memory;

means for requesting decryption of the retrieved encrypted secret data value from the trusted platform module that generated the retrieved encrypted secret data value in order to generate a decrypted secret data value;

means for repeatedly generating decrypted secret data values for each other trusted platform module within the data processing system;

means for comparing the decrypted secret data values; and means for identifying zero or more defective trusted platform modules based on the comparison of the decrypted secret data values.

5. The apparatus of claim 4 further comprising:

means for designating the trusted platform module as defective if the decrypted secret data value that is associated with the trusted platform module does not match one or more decrypted secret data values that are associated with different trusted platform modules within the data processing system.

6. The apparatus of claim 4 wherein the means for identifying defective trusted platform modules is used upon startup or restart of the data processing system.

7. A data processing system comprising:

one or more processors which process program instructions; a plurality of trusted platform modules; a trusted platform comprising at least one non-volatile memory; a memory device connected to said one or more processors; and program instructions residing in said memory device for using the trusted platform by reading secret data stored within the trusted platform using a hypervisor, requesting a trusted platform module to encrypt a copy of the secret data to generate an encrypted secret data value, storing the previously generated encrypted secret data value within the non-volatile memory within the trusted platform, repeatedly generating encrypted secret data values for each other trusted platform module and storing the generated encrypted secret data values so that the non-volatile memory contains multiple encrypted secret data values each of which is associated with the trusted platform module that generated the respective encrypted secret data value, retrieving the encrypted secret data value from the non-volatile memory, requesting decryption of the retrieved encrypted secret data value from the trusted platform module that generated the retrieved encrypted secret data value in order to generate a decrypted secret data value, repeatedly generating decrypted secret data values for each other trusted platform module, comparing the decrypted secret data values, and identifying zero or more defective trusted platform modules based on the comparison of the decrypted secret data values.

8. The data processing system of claim 7 wherein said program instructions further designate a trusted platform module as defective if the decrypted secret data value that is associated with the trusted platform module does not match one or more decrypted secret data values that are associated with different trusted platform modules.

9. The data processing system of claim 7 wherein the trusted platform modules are identified as defective upon startup or restart of the data processing system.

* * * * *